US012591872B2

(12) United States Patent
Ogi

(10) Patent No.: US 12,591,872 B2
(45) Date of Patent: Mar. 31, 2026

(54) ACCOUNTING PROCESSING METHOD, REGISTRATION PROCESSING METHOD, ACCOUNTING DEVICE, AND STORAGE MEDIUM

(71) Applicant: TOSHIBA TEC KABUSHIKI KAISHA, Tokyo (JP)

(72) Inventor: Yuki Ogi, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/359,168

(22) Filed: Jul. 26, 2023

(65) Prior Publication Data

US 2023/0368171 A1 Nov. 16, 2023

Related U.S. Application Data

(63) Continuation of application No. 17/065,615, filed on Oct. 8, 2020, now abandoned.

(30) Foreign Application Priority Data

Dec. 23, 2019 (JP) ................................. 2019-231954

(51) Int. Cl.
*G06Q 20/20* (2012.01)
*G06Q 30/0201* (2023.01)
(Continued)

(52) U.S. Cl.
CPC ......... *G06Q 20/202* (2013.01); *G06Q 20/201* (2013.01); *G06Q 20/204* (2013.01);
(Continued)

(58) Field of Classification Search
CPC .... G06Q 20/202; G06Q 40/12; G06Q 20/201; G06Q 20/204; G06Q 20/208; G06Q 20/209; G06Q 30/0201
See application file for complete search history.

(56) References Cited

U.S. PATENT DOCUMENTS 10,055,769 B1 * 8/2018 Todd ...................... G06Q 20/14
2013/0066751 A1 * 3/2013 Glazer ............... G06Q 30/0601
705/27.2

(Continued)

FOREIGN PATENT DOCUMENTS

JP 2003-331024 11/2003
TW 201933239 8/2019
TW 201933239 A * 8/2019

OTHER PUBLICATIONS

Indian Office Action for Indian Patent Application No. 202044047945 dated Mar. 18, 2024.

(Continued)

*Primary Examiner* — A. Hunter Wilder
*Assistant Examiner* — Joseph M Mutschler
(74) *Attorney, Agent, or Firm* — Amin, Turocy & Watson, LLP

(57) ABSTRACT

An accounting processing method executed by an accounting device includes a receiving step of receiving an input of a customer identifier for identifying a customer who performs accounting, an acquiring step of acquiring, from a storage device that stores registration data by store including transaction data indicating details of a purchase target commodity, a customer identifier of the customer who purchases the commodity, and a store identifier for identifying a store that sells the commodity, the registration data by store including the customer identifier received in the receiving step, an accounting step of executing accounting processing for the purchase target commodity based on the registration data by store acquired in the acquiring step, and an output step of outputting the details of the purchase target commodity for each the store identifier based on the registration data by store acquired in the acquiring step.

11 Claims, 10 Drawing Sheets

(51) Int. Cl.
*G06Q 30/0204* (2023.01)
*G06Q 40/12* (2023.01)

(52) U.S. Cl.
CPC ......... *G06Q 20/208* (2013.01); *G06Q 20/209*
(2013.01); *G06Q 30/0201* (2013.01); *G06Q*
*30/0204* (2013.01); *G06Q 40/12* (2013.12)

(56)           References Cited

U.S. PATENT DOCUMENTS

| | | |
|---|---|---|
| 2014/0351006 A1 | 11/2014 | Christner et al. |
| 2016/0110821 A1 | 4/2016 | Ejlersen et al. |
| 2016/0163002 A1 | 6/2016 | Brar |
| 2016/0321639 A1 | 11/2016 | Haraguchi et al. |
| 2020/0184539 A1* | 6/2020 | Pande ................ G06Q 30/0631 |

OTHER PUBLICATIONS

Non-Final Office Action for U.S. Appl. No. 17/065,615 mailed Dec. 22, 2022.
Final Office Action for U.S. Appl. No. 17/065,615 mailed Apr. 26, 2023.

* cited by examiner

T1

| MANAGEMENT NUMBER | REGISTRATION DATA BY STORE | | | | | |
| | USER ID | STORE CODE | TRANSACTION DATA | | | |
| | | | TRANSACTION NUMBER | COMMODITY CODE | COMMODITY INFORMATION | NUMBER OF PURCHASED ITEMS |
| 00001 | U0001 | SP1001 | 10010 | 110001 | ⋯ | 1 |
| | | | | 110002 | ⋯ | 1 |
| 00002 | U0005 | SP2001 | 20025 | 310001 | ⋯ | 2 |
| | | | | 310002 | ⋯ | 1 |
| 00003 | U0001 | SP7001 | 70031 | 710001 | ⋯ | 1 |
| | | | | 710002 | ⋯ | 2 |
| ⋮ | ⋮ | ⋮ | ⋮ | ⋮ | ⋮ | ⋮ |

30

ACCOUNTING DEVICE

351

INPUT RECEIVING UNIT

352

ACQUIRING UNIT

353

ACCOUNTING
PROCESSING UNIT

354

OUTPUT UNIT

R1

RECEIPT

DECEMBER 12, 2019    12:00

STORE A
  COMMODITY A11 X 1        ¥1,000
  COMMODITY A12 X 1        ¥1,500
SUBTOTAL                ¥2,500    D1

STORE G
  COMMODITY G11 X 2        ¥1,000
  COMMODITY G15 X 1        ¥2,000
SUBTOTAL                ¥3,000    D1

＊ ＊ ＊ ＊ ＊ ＊ ＊ ＊ ＊ ＊

TOTAL                  ¥5,500
DEPOSIT                ¥6,000    D2
CHANGE                 ¥500

FIG. 10

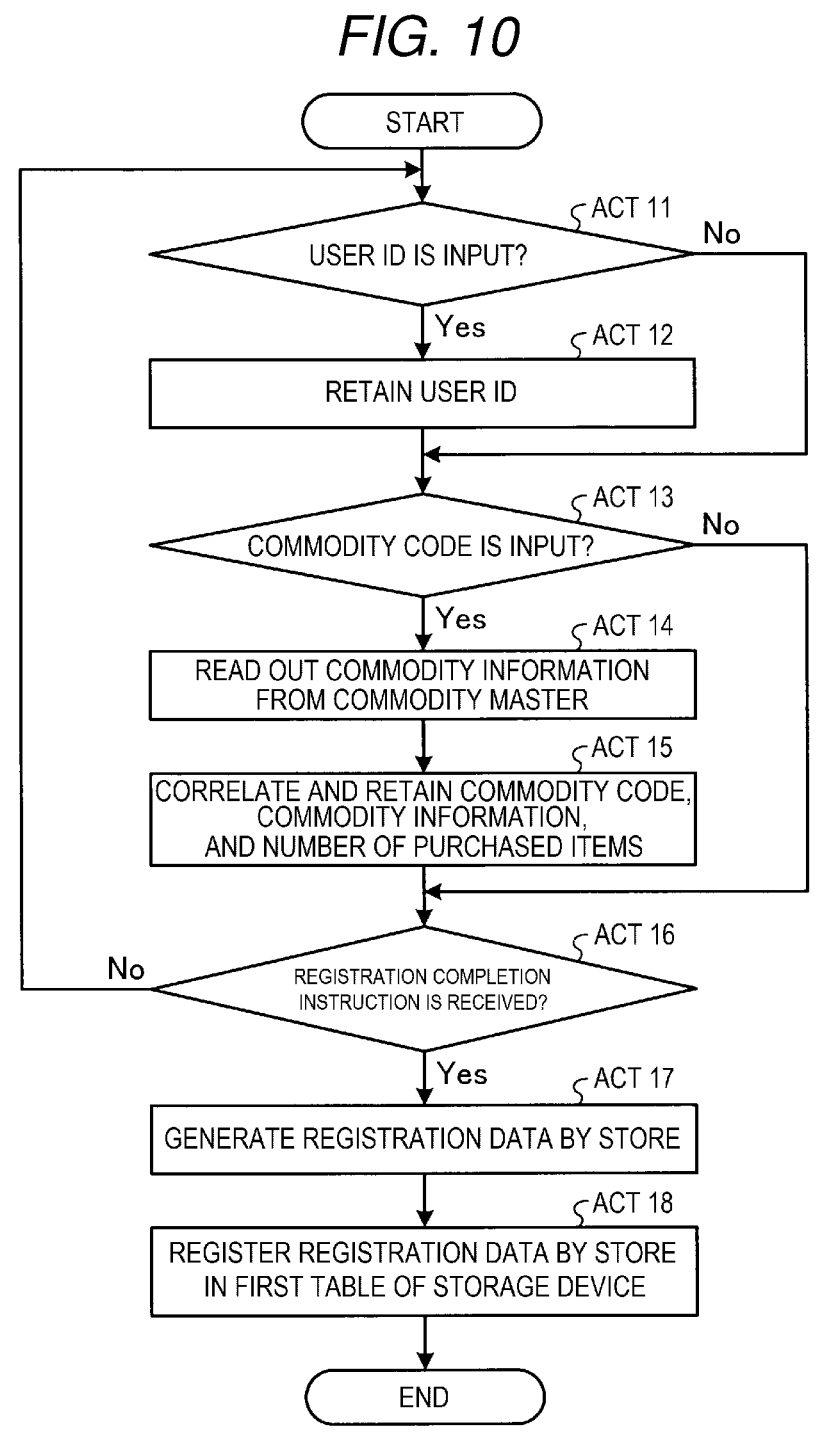

```
                    ┌─────────────┐
                    │    START    │
                    └─────────────┘
                           │
           ┌───────────────┤
           │               ▼
           │         ╱─────────────╲           ╭ACT 11
           │       ╱  USER ID IS     ╲    No
           │      ◁    INPUT?          ▷──────────┐
           │       ╲                 ╱            │
           │         ╲─────────────╱              │
           │               │ Yes     ╭ACT 12      │
           │               ▼                      │
           │    ┌──────────────────────┐          │
           │    │    RETAIN USER ID     │          │
           │    └──────────────────────┘          │
           │               │◀─────────────────────┘
           │               ▼
           │         ╱─────────────╲           ╭ACT 13
           │       ╱  COMMODITY      ╲    No
           │      ◁   CODE IS INPUT?   ▷─────────┐
           │       ╲                 ╱           │
           │         ╲─────────────╱             │
           │               │ Yes     ╭ACT 14     │
           │               ▼                     │
           │    ┌──────────────────────────┐     │
           │    │ READ OUT COMMODITY        │     │
           │    │ INFORMATION FROM          │     │
           │    │ COMMODITY MASTER          │     │
           │    └──────────────────────────┘     │
           │               │         ╭ACT 15     │
           │               ▼                     │
           │  ┌──────────────────────────────┐   │
           │  │ CORRELATE AND RETAIN          │   │
           │  │ COMMODITY CODE,               │   │
           │  │ COMMODITY INFORMATION,        │   │
           │  │ AND NUMBER OF PURCHASED ITEMS │   │
           │  └──────────────────────────────┘   │
           │               │◀────────────────────┘
           │               ▼
           │         ╱─────────────╲           ╭ACT 16
           │   No  ╱  REGISTRATION   ╲
           └──────◁  COMPLETION        ▷
                   ╲  INSTRUCTION IS  ╱
                    ╲  RECEIVED?    ╱
                      ╲───────────╱
                           │ Yes     ╭ACT 17
                           ▼
                ┌──────────────────────────┐
                │ GENERATE REGISTRATION     │
                │ DATA BY STORE             │
                └──────────────────────────┘
                           │         ╭ACT 18
                           ▼
                ┌──────────────────────────┐
                │ REGISTER REGISTRATION     │
                │ DATA BY STORE IN FIRST    │
                │ TABLE OF STORAGE DEVICE   │
                └──────────────────────────┘
                           │
                           ▼
                    ┌─────────────┐
                    │     END     │
                    └─────────────┘
```

FIG. 11

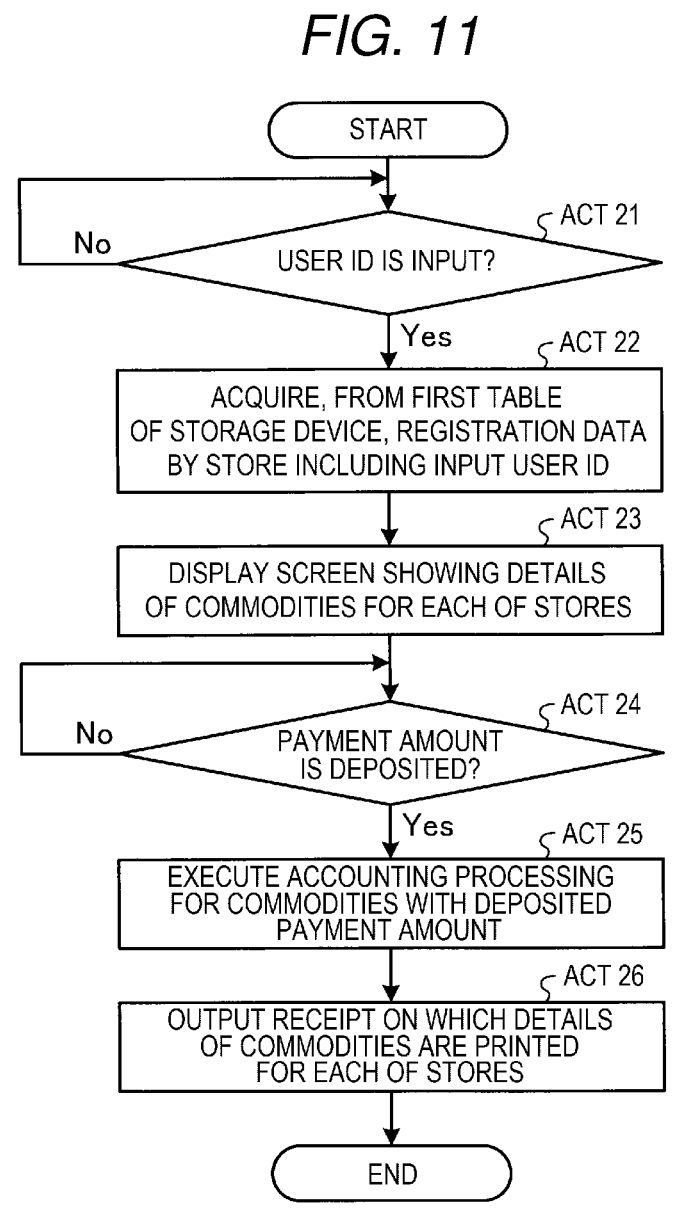

START

ACT 21
No ← USER ID IS INPUT?

Yes    ACT 22

ACQUIRE, FROM FIRST TABLE
OF STORAGE DEVICE, REGISTRATION DATA
BY STORE INCLUDING INPUT USER ID

ACT 23

DISPLAY SCREEN SHOWING DETAILS
OF COMMODITIES FOR EACH OF STORES

ACT 24
No ← PAYMENT AMOUNT
IS DEPOSITED?

Yes    ACT 25

EXECUTE ACCOUNTING PROCESSING
FOR COMMODITIES WITH DEPOSITED
PAYMENT AMOUNT

ACT 26

OUTPUT RECEIPT ON WHICH DETAILS
OF COMMODITIES ARE PRINTED
FOR EACH OF STORES

END

T2

| GROUP ID | MEMBER (USER ID) |
|----------|------------------|
| G0001 | U0001 |
| | U0002 |
| | U0003 |
| G0002 | U0021 |
| | U0022 |
| ⋮ | ⋮ |

ACCOUNTING PROCESSING METHOD, REGISTRATION PROCESSING METHOD, ACCOUNTING DEVICE, AND STORAGE MEDIUM

CROSS-REFERENCE TO RELATED APPLICATIONS

This application is a Continuation of application Ser. No. 17/065,615 filed on Oct. 8, 2020, the entire contents of which are incorporated herein by reference.

This application is based upon and claims the benefit of priority from Japanese Patent Application No. 2019-231954, filed Dec. 23, 2019, the entire contents of which are incorporated herein by reference.

FIELD

Embodiments described herein relate generally to an accounting processing method, a registration processing method, an accounting device, and a non-transitory storage medium.

BACKGROUND

There has been a commercial complex facility (hereinafter referred to as facility) such as a shopping center housing a plurality of stores. In such a facility, a customer can purchase desired commodities while moving around the stores housed in the facility.

Since the stores occupying the facility are respectively independent retail stores, the customer performs accounting for each of the stores. Accordingly, there is an inconvenience for the customer in that, for example, the customer waits for accounting while holding commodities purchased in other stores.

There has been proposed a system that causes a POS system in operation in a store to cooperate with an Internet order system to deliver commodities, orders for which are input in a real store, to a customer's home. However, in the system in the past, purchase of commodities in a plurality of stores is not considered at all. There is room of further improvement.

DESCRIPTION OF THE DRAWINGS

FIG. 10 is a flowchart illustrating an example of processing performed by the registration device;

FIG. 11 is a flowchart illustrating an example of processing performed by the accounting device;

DETAILED DESCRIPTION

An aspect of embodiments is to provide an accounting processing method, a registration processing method, an accounting device, and a non-transitory storage medium comprising a program capable of improving convenience relating to purchase of commodities in a facility occupied by a plurality of stores.

An accounting processing method in an embodiment is an accounting processing method executed by an accounting device, the accounting processing method including a receiving step, an acquiring step, an accounting step, and an output step. In the receiving step, an input of a customer identifier for identifying a customer who performs accounting is received. In the acquiring step, from a storage device that stores registration data by store generated for each transaction in each store, which occupy a facility, and including transaction data indicating details of a purchase target commodity, a customer identifier of the customer who purchases the commodity, and a store identifier for identifying a store that sells the commodity, the registration data by store including the customer identifier received in the receiving step is acquired. In the accounting step, accounting processing for the purchase target commodity is executed based on the registration data by store acquired in the acquiring step. In the output step, the details of the purchase target commodity are output for each store identifier based on the registration data by store acquired in the acquiring step.

An accounting processing method, a registration processing method, an accounting device, and a program according to an embodiment are explained below with reference to the drawings. In the following explanation, an application example of a facility such as a shopping center occupied by a plurality of stores is explained. However, embodiments are not limited to this embodiment.

Figure 1:
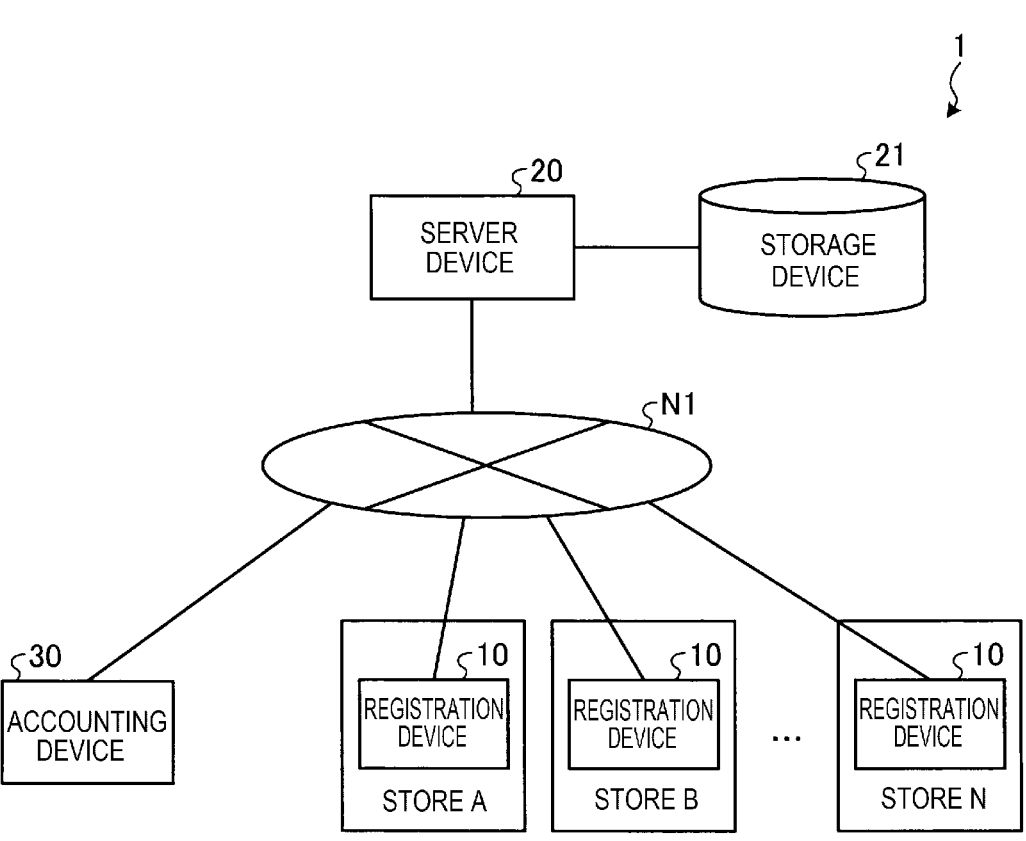
FIG. 1 is a diagram schematically illustrating an example of the configuration of an accounting processing system according to an embodiment.

FIG. 1 is a diagram schematically illustrating an example of the configuration of an accounting processing system according to the embodiment. As illustrated in FIG. 1, an accounting processing system 1 includes registration devices 10, a server device 20, and an accounting device 30. The registration devices 10, the server device 20, and the accounting device 30 are connected to a network N1 such as a LAN (Local Area Network) provided in the facility and are capable of communicating with one another. The numbers of the registration devices 10 and accounting devices 30 are not limited to the numbers in the example illustrated in FIG. 1.

The registration device 10 is an example of a commodity registration device described in claims. The registration device 10 is a commodity sales data processing device such as a POS (Point of sale system) terminal and provided in each store (a store A and a store B to a store N) occupying the facility.

The registration device 10 generates, for each transaction in the store, registration data by store including transaction data indicating details of a commodity set as a purchase target by a customer, a customer identifier of the customer who purchases the commodity, and a store identifier for identifying the store that sells the commodity. The generated registration data by store is transmitted to the server device 20 to be registered (hereinafter referred to as stored as well) in a storage device 21 of the server device 20. In this embodiment, "transaction" means a series of procedures relating to commodity purchase performed in the store, specifically, a registration procedure of a commodity selected as a purchase target by one customer.

The server device 20 is a server device that performs storage and management of the registration data by store. The server device 20 includes the storage device 21 such as a database and stores the registration data by store transmitted from each of the registration devices 10 in the storage device 21 and manages the registration data by store.

The accounting device 30 is an example of an accounting device described in claims. The accounting device 30 is, for example, the same commodity sales data processing device as the registration device 10 and is provided in a common area or the like in the facility.

The accounting device 30 cooperates with the server device 20 to execute accounting processing for the commodity set as the purchase target by the customer. Specifically, the accounting device 30 acquires, from the storage device 21, the registration data by store relating to the customer who performs accounting. The accounting device 30 executes the accounting processing based on the acquired registration data by store.

The configurations of the registration device 10, the server device 20, and the accounting device 30 are explained.

Figure 2:
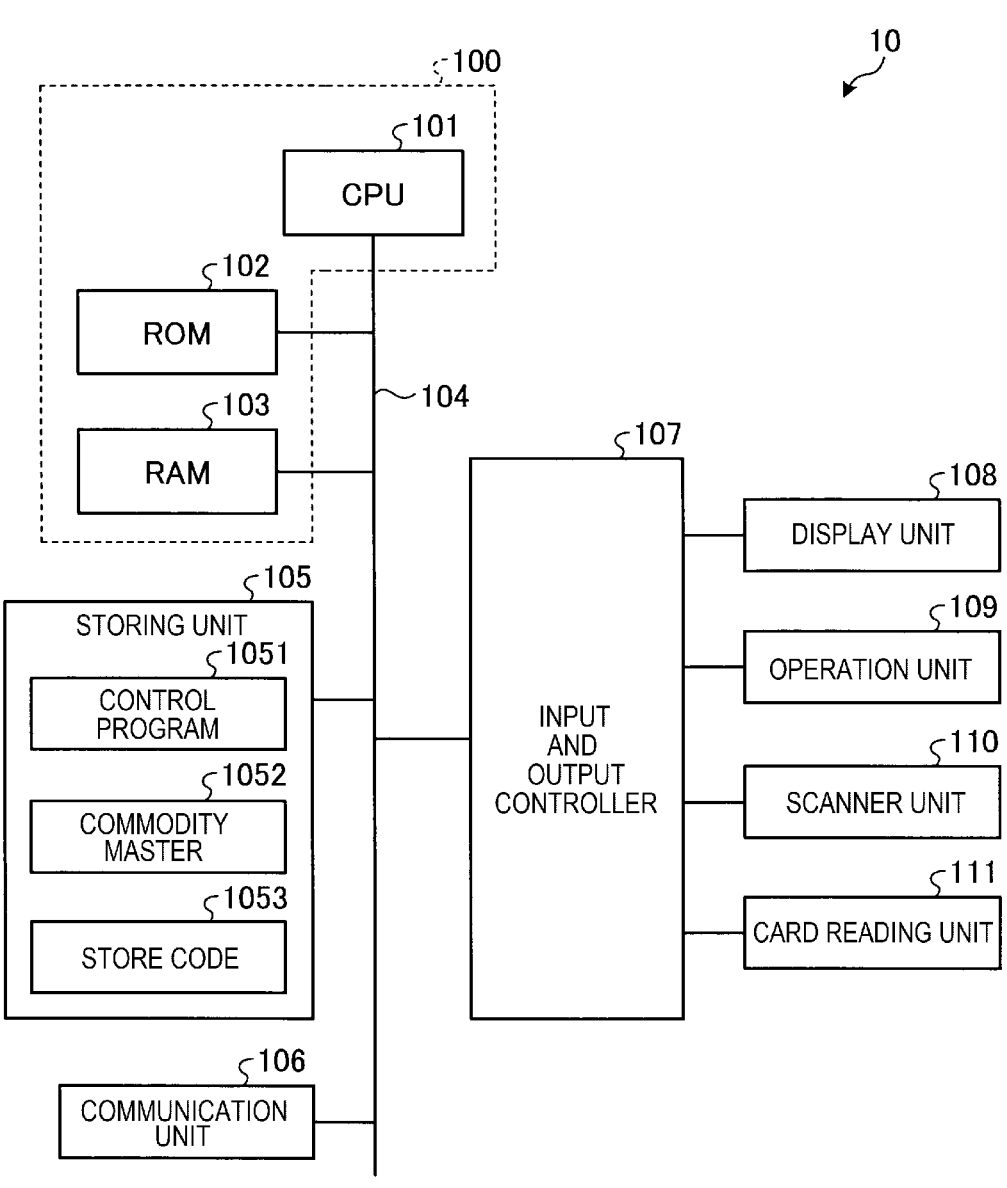
FIG. 2 is a diagram illustrating an example of a hardware configuration of a registration device according to the embodiment.

FIG. 2 is a diagram illustrating an example of a hardware configuration of the registration device 10. As illustrated in FIG. 2, the registration device 10 includes a CPU (Central Processing Unit) 101, a ROM (Read Only Memory) 102, and a RAM (Random Access Memory) 103.

The CPU 101 is an example of a processor and collectively controls the operation of the registration device 10. The ROM 102 stores various programs. The RAM 103 is a work space in which programs and various data are loaded. The CPU 101, the ROM 102, and the RAM 103 are connected via a bus 104 to configure a control unit 100 having a computer configuration. In the control unit 100, the CPU 101 operates according to a control program 1051 stored in the ROM 102 or a storing unit 105 and loaded in the RAM 103 to thereby execute various kinds of processing.

The control unit 100 is connected to the storing unit 105 and a communication unit 106 via the bus 104. The storing unit 105 is configured by a HDD (hard Disk Drive), a flash memory, or the like. The storing unit 105 maintains stored content even if a power supply is turned off. The storing unit 105 stores, for example, the control program 1051, a commodity master 1052, and a store code 1053.

The control program 1051 is a control program for controlling the operation of the registration device 10. For example, the commodity master 1052 correlates commodity information of commodities sold in the store with commodity codes of the commodities and stores the commodity information. The commodity code is an example of a commodity identifier capable of identifying (specifying) a type of a commodity. The commodity information includes information concerning a commodity name, a unit price, and the like of a commodity corresponding to the commodity information. The store code 1053 is an example of a store identifier for identifying the store.

The communication unit 106 is a communication interface connectable to the network N1. The communication unit 106 performs communication with an external device such as the server device 20 via the network N1.

A display unit 108, an operation unit 109, a scanner unit 110, a card reading unit 111, and the like are connected to the control unit 100 via the bus 104 and an input and output controller 107.

The display unit 108 is a display device such as an LCD and displays various kinds of information according to control by the control unit 100. The operation unit 109 includes various operation buttons such as number keys and a closing key and outputs key information corresponding to operation by an operator to the control unit 100. The operation unit 109 may be, for example, a touch panel provided on the surface of the display unit 108.

The scanner unit 110 is a reading device capable of reading a code symbol such as a barcode or a two-dimensional code.

For example, the scanner unit 110 reads a commodity code from a code symbol attached to a commodity and outputs the read commodity code to the CPU 101. For example, the scanner unit 110 reads a user ID from a code symbol displayed on a portable terminal (not illustrated) carried by a customer and outputs the read user ID to the CPU 101. The user ID is an example of a customer identifier for identifying each customer. As the user ID, specific information of the customer such as an identification number or a telephone number uniquely allocated to the customer can be used. The commodity code and the user ID can be identified by, for example, a difference of a code system.

The card reading unit 111 is a reading device that reads information from a card medium such as a magnetic card or an IC card. For example, the card reading unit 111 reads a user ID from a card medium (for example, a member card) carried by the customer and outputs the read user ID to the CPU 101.

Figure 3:
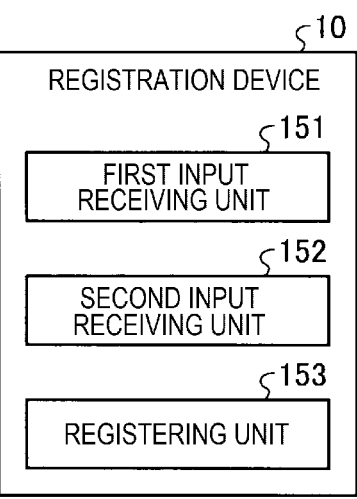
FIG. 3 is a diagram illustrating an example of a functional configuration of the registration device.

FIG. 3 is a diagram illustrating an example of a functional configuration of the registration device 10. As illustrated in FIG. 3, the registration device 10 includes a first input receiving unit 151, a second input receiving unit 152, and a registering unit 153 as functional units.

A part or all of the functional units may be software configuration realized by cooperation of the processor (for example, the CPU 101) of the registration device 10 and various programs (for example, the control program 1051) stored in a memory (for example, the ROM 102 or the storing unit 105). A part or all of the functional units may be a hardware configuration realized by a dedicated circuit or the like mounted on the registration device 10.

The first input receiving unit 151 receives an input of a user ID for identifying the customer. Specifically, the first input receiving unit 151 receives an input of a user ID read by the reading device such as the scanner unit 110 or the card reading unit 111. If receiving the input of the user ID, the first input receiving unit 151 retains the received user ID in the RAM 103 or the like.

The second input receiving unit 152 receives an input of a commodity selected as a purchase target by the customer. Specifically, the second input receiving unit 152 receives an input of a commodity code read via the scanner unit 110. If receiving the input of the commodity code, the second input receiving unit 152 reads out, from the commodity master 1052, commodity information corresponding to the commodity code. The second input receiving unit 152 correlates the input commodity code, the commodity information read out from the commodity master 1052, and the number of purchased items and retains the commodity code, the commodity information, and the number of purchased items in the RAM 103 or the like. The number of purchased items may be input via the operation unit 109 or may be derived by counting the number of times the same commodity code is input.

The registering unit 153 generates, for each transactions registration data by store including the user ID received by the first input receiving unit 151, transaction data indicating details of the commodity received by the second input receiving unit 152, and the store code 1053 for identifying the store.

The transaction data indicates details of a commodity corresponding to the commodity code received by the second input receiving unit 152 and includes at least information for enabling calculation of a total amount of the commodity. For example, the registering unit 153 generates transaction data including sets of commodity codes, commodity information, and the numbers of purchased items retained in the RAM 103 or the like by the second input receiving unit 152.

The transaction data is not limited to the example explained above. For example, the registering unit 153 may issue a transaction number specific to each transaction and include the issued transaction number in the transaction data. The registering unit 153 may calculate, based on unit prices included in commodity information of commodities and the numbers of items of the commodities retained in the RAM 103 or the like, a total amount of commodities set as purchase targets in the store (hereinafter referred to as total amount by store) and include the calculated total amount by store in the transaction data.

The registering unit 153 outputs the generated registration data by store to the server device 20. For example, if receiving operation for registration completion via the operation unit 109, the registering unit 153 generates registration data by store including transaction data of commodities input until the operation is performed and transmits the registration data by store to the server device 20. The registration data by store transmitted to the server device 20 is stored in a first table T1 of the storage device 21. That is, the registering unit 153 outputs the registration data by store to the server device 20 to register the registration data by store in the first table T1 of the storage device 21.

After an input of a purchase target commodity is completed, the customer may take out the commodity from the store and move to another store or may perform accounting in the accounting device 30. After the input of the purchase target commodity is completed, the customer may perform a procedure for delivering the commodity to the customer's home or the like to move to another store empty-handed or perform accounting in the accounting device 30. In the latter case, a publicly-known and publicly-used technique or mechanism can be used for the procedure for the delivery and a system relating to the delivery.

Figure 4:
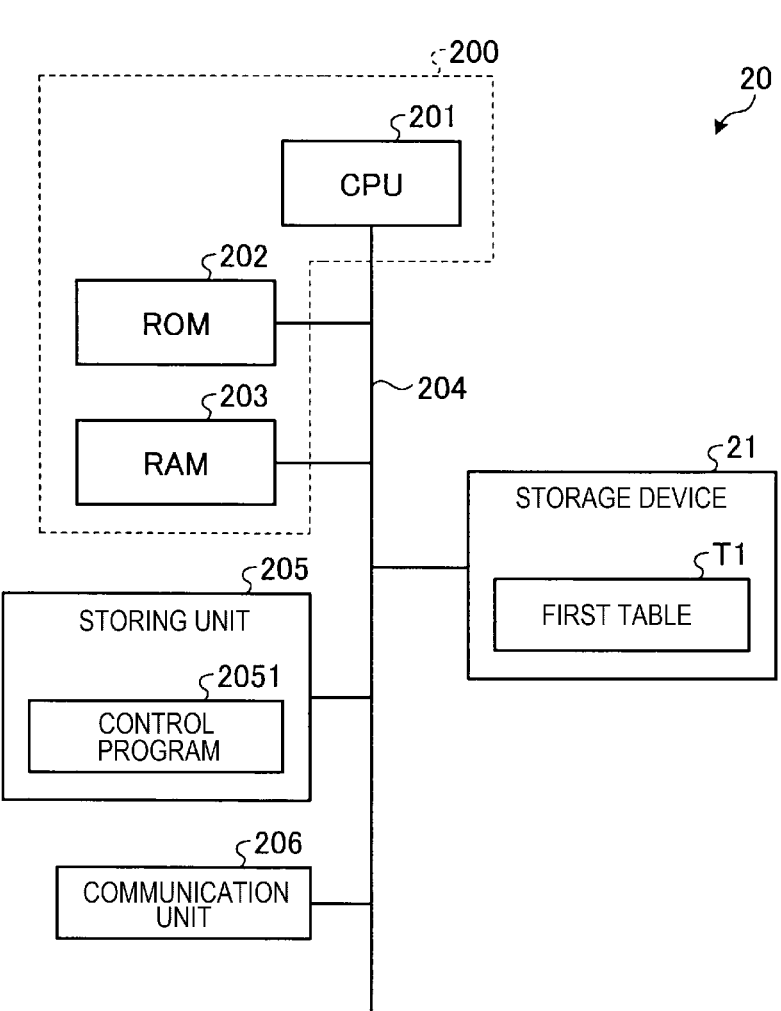
FIG. 4 is a diagram illustrating an example of a hardware configuration of a server device according to the embodiment.

FIG. 4 is a diagram illustrating an example of a hardware configuration of the server device 20. As illustrated in FIG. 4, the server device 20 includes a CPU 201, a ROM 202, and a RAM 203.

The CPU 201 is an example of a processor and collectively controls the operation of the server device 20. The ROM 202 stores various programs. The RAM 203 is a work space in which programs and various data are loaded. The CPU 201, the ROM 202, and the RAM 203 are connected via the bus 204 to configure a control unit 200 having a computer configuration. In the control unit 200, the CPU 201 operates according to a control program 2051 stored in the ROM 202 or a storing unit 205 and developed in the RAM 203 to thereby execute various kinds of processing.

The control unit 200 is connected to the storing unit 205 and a communication unit 206 via the bus 204. The storing unit 205 is configured by a HDD, a flash memory, or the like and maintains stored content even if a power supply is turned off. The storing unit 205 stores, for example, the control program 2051. The control program 2051 is a control program for controlling the operation of the server device 20.

The communication unit 206 is a communication interface connectable to the network N1. The communication unit 206 performs communication with an external device such as the registration device 10 or the accounting device 30 via the network N1.

The storage device 21 is connected to the control unit 200 via the bus 204. Like the storing unit 205, the storage device 21 is configured by a HDD, a flash memory, or the like and maintains stored content even if a power supply is turned off. In FIG. 4, the storing unit 205 and the storage device 21 are separated. However, the storing unit 205 and the storage device 21 may be realized by the same storage device.

Figure 5:
FIG. 5 is a diagram illustrating an example of a data configuration of a first table according to the embodiment.

The storage device 21 retains the first table T1 for storing and managing the registration data by store. FIG. 5 is a diagram illustrating an example of a data configuration of the first table T1. As illustrated in FIG. 5, the first table T1 stores the registration data by store transmitted from the registration devices 10 in the stores. A management number of the first table T1 is an index for managing the order and the like of the registered registration data by store.

As explained above, the registration data by store includes the user ID, the store code, and the transaction data. The transaction data includes, for example, a transaction number, a commodity code, commodity information, and the number of purchased items. The transaction number may be a transaction number individually used in each of the stores or may be a transaction number used in all the stores.

Figure 6:
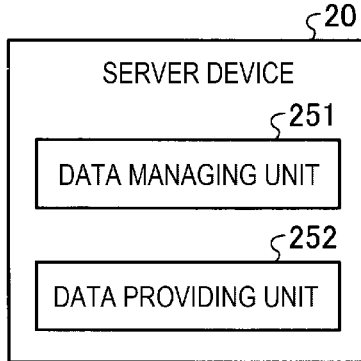
FIG. 6 is a diagram illustrating an example of a functional configuration of the server device.

FIG. 6 is a diagram illustrating an example of a functional configuration of the server device 20. As illustrated in FIG. 6, the server device 20 includes a data managing unit 251 and a data providing unit 252 as functional units.

A part or all of the functional units may be a software configuration realized by cooperation of the processor (for example, the CPU 201) of the server device 20 and various programs (for example, the control programs 2051) stored in a memory (for example, the ROM 202 or the storing unit 205). A part or all of the functional units may be a hardware configuration realized by a dedicated circuit or the like mounted on the server device 20.

The data managing unit 251 performs management of the storage device 21. Specifically, if receiving, via the communication unit 206, the registration data by store transmitted from the registering unit 153 of the registration device 10, the data managing unit 251 stores the registration data by store in the first table T1 of the storage device 21.

It is preferable that the data managing unit 251 stores, by using the management number or the like, the registration data by store in the order of the reception of the registration data by store. The data managing unit 251 may correlate, for example, date and time information indicating date and time when the registration data by store is received with the registration data by store and store the date and time information.

If the transaction number and the management number of the registration data by store, for which the accounting processing is completed, are notified from the accounting device 30, the data managing unit 251 excludes the relevant registration data by store from transmission targets by, for example, removing the registration data by store from the first table T1. For example, the data managing unit 251 may move, according to a completion notification of the accounting processing, the relevant registration data by store to not-illustrated another table (an accounting completion table or the like). For example, the data managing unit 251 may perform control to exclude, according to the completion notification of the accounting processing, the relevant registration data by store from the transmission target by adding an accounting completion flag or the like to the registration data by store.

The data providing unit 252 provides data stored in the storage device 21 to an external device. Specifically, if receiving a request including a user ID or the like as a search key from the accounting device 30, the data providing unit 252 reads out the registration data by store corresponding to the requested condition from the first table T1 and transmits the registration data by store to the accounting device 30 at a request source.

The data providing unit 252 may accessibly provide the storage device 21 to the accounting device 30. Consequently, it is possible to directly refer to the first table T1 or directly operate the first table T1 from the accounting device 30.

Figure 7:
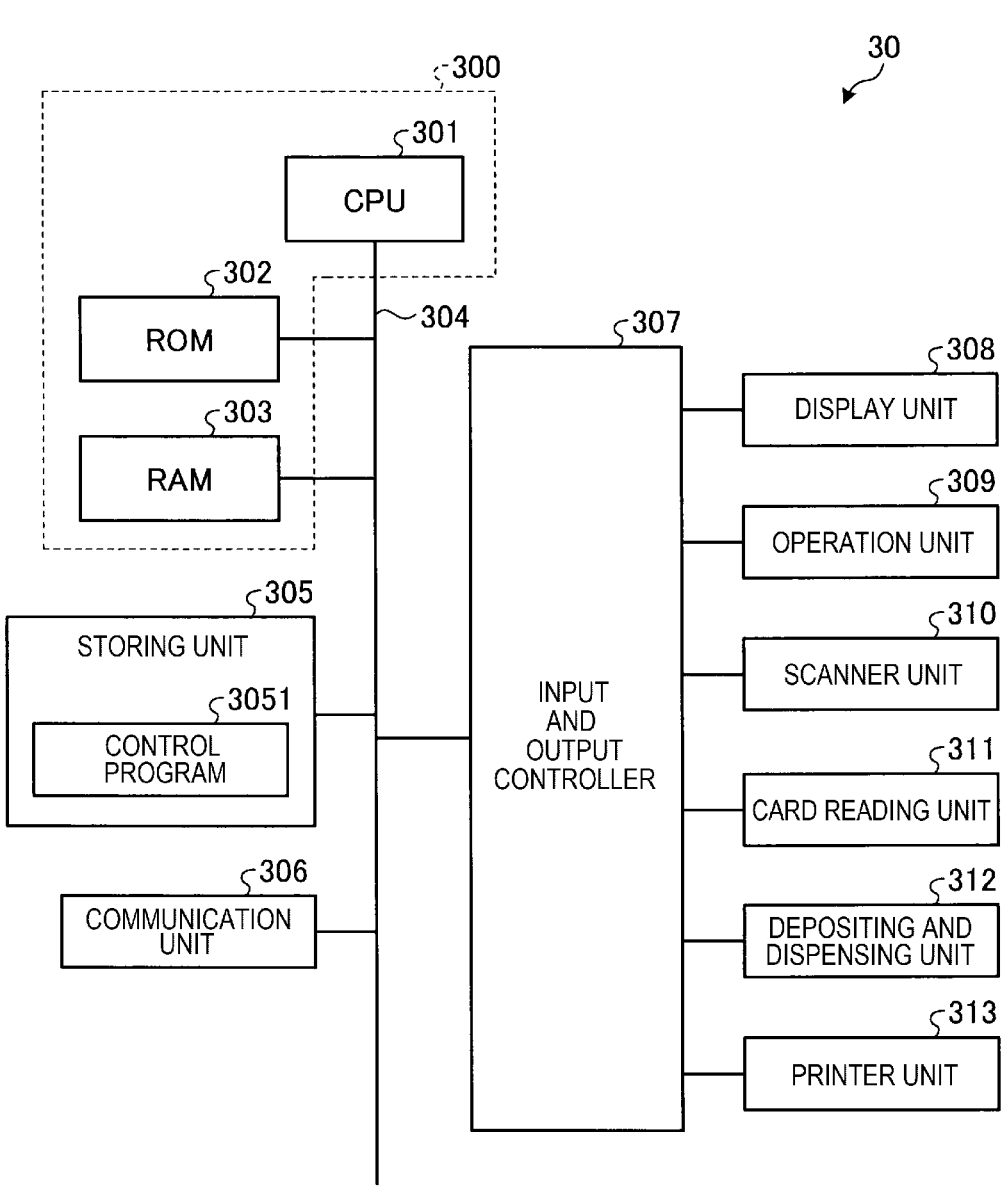
FIG. 7 is a diagram illustrating an example of a hardware configuration of an accounting device according to the embodiment.

FIG. 7 is a diagram illustrating an example of a hardware configuration of the accounting device 30. As illustrated in FIG. 7, the accounting device 30 includes a CPU 301, a ROM 302, and a RAM 303.

The CPU 301 is an example of a processor and collectively controls the operation of the accounting device 30. The ROM 302 stores various programs. The RAM 303 is a work space in which programs and various data are loaded. The CPU 301, the ROM 302, and the RAM 303 are connected via a bus 304 to configure a control unit 300 having a computer configuration. In the control unit 300, the CPU 301 operates according to a control program 3051 stored in the ROM 302 or a storing unit 305 and loaded in the RAM 303 to thereby execute various kinds of processing.

The control unit 300 is connected to the storing unit 305 and a communication unit 306 via the bus 304. The storing unit 305 is configured by a HDD, a flash memory, or the like and maintains stored content even if a power supply is turned off. The storing unit 305 stores, for example, the control program 3051. The control program 3051 is a control program for controlling the operation of the accounting device 30.

The communication unit 306 is a communication interface connectable to the network N1. The communication unit 306 performs communication with an external device such as the server device 20 via the network N1.

A display unit 308, an operation unit 309, a scanner unit 310, a card reading unit 311, a depositing and dispensing unit 312, a printer unit 313, and the like are connected to the control unit 300 via the bus 304 and an input and output controller 307.

The display unit 308 is a display device such as an LCD and displays various kinds of information according to control by the control unit 300. The operation unit 309 includes various operation buttons such as number keys and a closing key and outputs key information corresponding to operation by the operator to the control unit 300. The operation unit 309 may be, for example, a touch panel provided on the surface of the display unit 308.

The scanner unit 310 is a reading device capable of reading a code symbol such as a barcode or a two-dimensional code. For example, the scanner unit 310 reads a user ID or the like from a code symbol displayed on a portable terminal (not illustrated) carried by the customer and outputs read information to the CPU 301. For example, the scanner unit 310 reads electronic settlement information for enabling electronic settlement from the code symbol displayed on the portable terminal (not illustrated) carried by the customer and outputs the read electronic settlement information to the CPU 301.

The card reading unit 311 is a reading device that reads information from a card medium such as a magnetic card or an IC card. For example, the card reading unit 311 reads a user ID from a card medium (for example, a member card) owned by the customer and outputs the read user ID to the CPU 301. The card reading unit 311 reads electronic settlement information for enabling electronic settlement from a card medium (for example, a credit card) owned by the customer and outputs the read electronic settlement information to the CPU 301.

The depositing and dispensing unit 312 includes a storing unit (not illustrated) that stores money (coins and bills) for each denomination. The depositing and dispensing unit 312 executes depositing processing for a payment amount, dispensing processing for change, and the like. The printer unit 313 prints a receipt relating to the accounting processing executed by the control unit 300.

Figure 8:
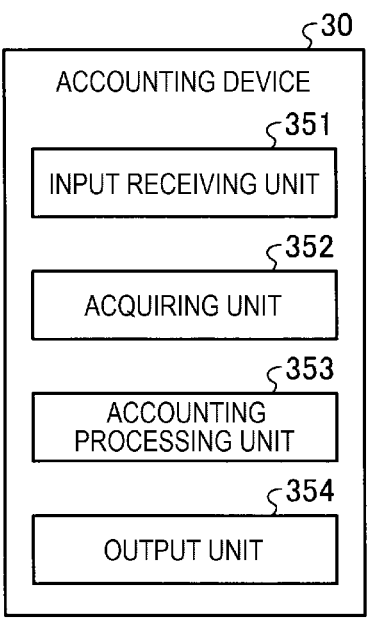
FIG. 8 is a diagram illustrating an example of a functional configuration of the accounting device.

FIG. 8 is a diagram illustrating an example of a functional configuration of the accounting device 30. As illustrated in FIG. 8, the accounting device 30 includes an input receiving unit 351, an acquiring unit 352, an accounting processing unit 353, and an output unit 354 as functional units.

A part or all of the functional units may be a software configuration realized by cooperation of the processor (for example, the CPU 301) of the accounting device 30 and various programs (for example, the control program 3051) stored in a memory (for example, the ROM 302 or the storing unit 305). A part or all of the functional units included in the accounting device 30 may be a hardware configuration realized by a dedicated circuit or the like mounted on the accounting device 30.

The input receiving unit 351 is an example of a receiving unit described in claims. The input receiving unit 351 receives an input of a user ID of a customer who performs accounting. Specifically, the input receiving unit 351 receives an input of a user ID read by the reading device such as the scanner unit 310 or the card reading unit 311.

The acquiring unit 352 is an example of an acquiring unit described in claims. The acquiring unit 352 acquires, from the first table T1 of the storage device 21, registration data by store including the user ID received by the input receiving unit 351.

For example, the acquiring unit 352 may transmit the user ID received by the input receiving unit 351 to the server device 20 as a search key to request the server device 20 to extract the registration data by store including the user ID. In this case, the data providing unit 252 of the server device 20 reads out, from the first table T1, the registration data by store including the user ID designated as the search key and transmits the registration data by store to the accounting device 30 at a request source. Consequently, the acquiring unit 352 can acquire, out of the registration data by store stored in the storage device 21, registration data by store relating to the customer who performs accounting.

For example, if the accounting device 30 can directly access the storage device 21, the acquiring unit 352 refers to the first table T1 to search for the registration data by store including the user ID received by the input receiving unit 351. The acquiring unit 352 reads out the relevant registration data by store from the first table T1. Consequently, the acquiring unit 352 can acquire, out of the registration data by store stored in the storage device 21, the registration data by store relating to the customer who performs accounting.

The operation of the acquiring unit 352 is explained with reference to FIG. 5. For example, it is assumed that a user ID received by the input receiving unit 351 is "U0001". In this case, the acquiring unit 352 acquires, from the first table T1, registration data by store with management numbers "0001" and "0003" including "U0001".

In this way, if a customer corresponding to the input user ID performs registration of commodities in a plurality of stores, registration data by store generated by the registration devices 10 of the stores are acquired by the acquiring unit 352.

Referring back to FIG. 8, the accounting processing unit 353 is an example of an accounting unit described in claims. The accounting processing unit 353 executes, based on transaction data included in each of the registration data by store extracted by the acquiring unit 352, accounting processing for commodities set as purchase targets.

Specifically, the accounting processing unit 353 calculates, based on unit prices, the numbers of purchased items, and the like of commodities included in the transaction data, a total amount of the commodities registered in the stores. If the accounting processing unit 353 detects that a payment amount is deposited from any one of the scanner unit 310, the card reading unit 311, and the depositing and dispensing unit 312, the accounting processing unit 353 executes accounting processing for performing accounting of the total amount with the deposited payment amount. If total amounts by store are included in the transaction data, the accounting processing unit 353 may add up the total amounts by store to calculate the total amount of the commodities registered in the stores.

For example, if registration data by store relating to a plurality of stores are acquired from the first table T1, the accounting processing unit 353 calculates, based on transaction data included in the registration data by store, a total amount of commodities registered in the plurality of stores. The accounting processing unit 353 performs accounting processing for the calculated total amount to collectively execute accounting processing for the plurality of stores. It is assumed that the accounting processing unit 353 notifies a transaction number and a management number of registration data by store, for which the accounting processing is completed, to the server device 20 to perform processing for excluding the registration data by store from the first table T1.

According to the processing explained above, the customer using the accounting device 30 can perform, at a time, accounting of commodities selected as purchase targets in the plurality of stores. Consequently, the customer does not wait for accounting in the stores while holding purchased commodities or does not perform accounting in the stores while watching for theft of purchased commodities. Therefore, it is possible to achieve improvement of convenience.

At predetermined timing after the accounting processing completion, the accounting processing unit 353 may notify the stores that the accounting processing is completed. In this case, for example, the accounting processing unit 353 may transmit the transaction number included in the registration data by store, for which the accounting processing is completed, to the registration device 10 of the store corresponding to the store code 1053 to notify that the accounting processing is completed. Consequently, the stores can calculate sales of transactions for which the accounting processing is completed.

In this case, timing for performing the notification may be any timing. For example, at timing when accounting processing is completed, a transaction number of registration data by store relating to the accounting processing may be notified. For example, at predetermined time such as timing when the facility is closed, transaction numbers of registration data by store for which accounting processing is completed up to the predetermined time may be collectively notified.

The output unit 354 is an example of an output unit described in claims. The output unit 354 controls the display unit 308 and the printer unit 313 to output details of a commodity set as a target of accounting processing. For example, the output unit 354 causes, based on the registration data by store acquired by the acquiring unit 352, the display unit 308 to display and output the details of the commodity set as the target of the accounting processing. For example, the output unit 354 causes, based on the registration data by store, the printer unit 313 to output a receipt on which the details of the commodity set as the target of the accounting processing and details of the accounting processing are printed.

Specifically, the output unit 354 causes the display unit 308 and the printer unit 313 to output, for each store code of the registration data by store, that is, for each store in which registration of commodities is performed, as details of the commodity, information such as commodity names, unit prices, and the numbers of purchased items of the commodities included in the transaction data of the registration data by store. The output unit 354 correlates total amounts by store calculated from transaction data of the stores with transaction data of the relevant stores and causes the display unit 308 and the printer unit 313 to output the total amounts by store. The output unit 354 cooperates with the accounting processing unit 353 to cause the display unit 308 and the printer unit 311 to output, as details of the accounting processing, a total amount of commodities set as targets of the accounting processing, a payment amount, a change amount, and the like. The total amounts by store may be calculated from unit prices and the numbers of purchased items of commodities included in the transaction data of the stores. If total amounts by store are included in the transaction data, the total amounts by store may be used.

Figure 9:
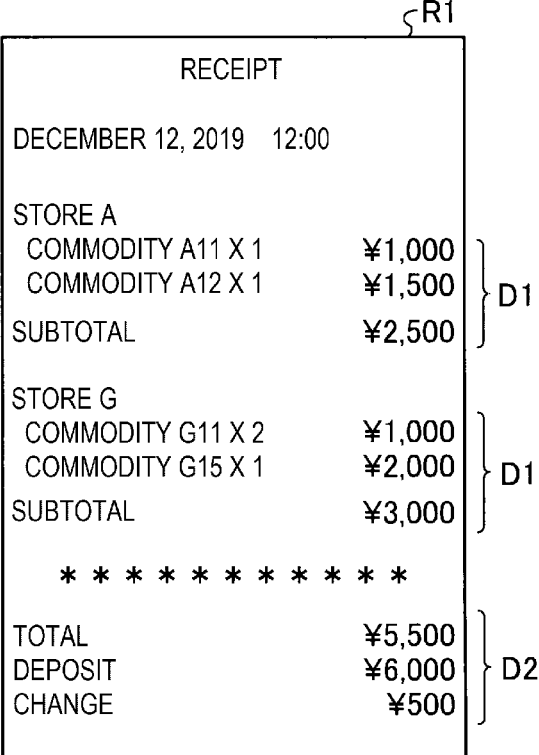
FIG. 9 is a diagram illustrating an example of a receipt output by an output unit according to the embodiment.

FIG. 9 is a diagram illustrating an example of a receipt output by the output unit 354. As illustrated in FIG. 9, a receipt R1 includes first regions D1 for printing details of commodities. The first regions D1 are prepared for each store code of registration data by store set as targets of accounting processing. In the first regions D1, besides commodity names, the numbers of purchased items, prices (the numbers of purchased items× unit prices), and the like of commodities included in transaction data, total amounts by store (in FIG. 9, described as subtotals) are printed. In FIG. 9, an example is illustrated in which details of commodities registered in the store A and the store B are printed. Output order for each of the stores in the first regions D1 may be any order. For example, a store having registration data by store registered earlier may be output first. The stores may be displayed based on predetermined priority level such as alphabetic order of store names.

The receipt R1 includes a second region D2 for printing details of the accounting processing. In the second region D2, a total amount (a total) of the commodities printed in the first regions D1, a payment amount (a deposit), a change amount (change), and the like are printed.

In this way, the output unit 354 causes, based on the registration data by store acquired by the acquiring unit 352, the display unit 308 and the printer unit 313 to output, for each of the store codes of the registration data by store, the details of the commodities, the total amounts by store, and the like. Consequently, the customer can easily confirm, by viewing an output result of the output unit 354, the details of the commodities registered in the stores and the total amounts by store. Therefore, the output unit 354 can improve convenience relating to purchase of commodities in a facility occupied by a plurality of stores. In FIG. 9, the receipt R1, which is a result of a print output, is explained as an example. However, it is assumed that an output is performed in the same form in display output to the display unit 308.

In the following explanation, operation examples of the registration device 10 and the accounting device 30 are explained.

First, the operation example of the registration device 10 is explained with reference to FIG. 10. FIG. 10 is a flowchart illustrating an example of processing performed by the registration device 10. This processing is executed, for example, if a registration start for a commodity is instructed via the operation unit 109.

First, the first input receiving unit 151 determines whether a user ID is input via the reading device such as the scanner unit 110 or the card reading unit 111 (ACT 11). If receiving an input of a user ID (Yes in ACT 11), the first input receiving unit 151 retains the received user ID in the RAM 103 or the like (ACT 12) and thereafter shifts the processing to ACT 13.

If a user ID is not input in ACT 11 (NO in ACT 11), the first input receiving unit 151 shifts the processing to ACT 13. If a user ID is retained at a point in time of ACT 11, the first input receiving unit 151 may skip ACT 11 to directly shift the processing to ACT 13.

Subsequently, the second input receiving unit 152 determines whether a commodity code is input via the scanner unit 110 (ACT 13). If the second input receiving unit 152 receives an input of a commodity code (Yes in ACT 13), the second input receiving unit 152 reads out commodity information corresponding to the commodity code from the commodity master 1052 (ACT 14). Subsequently, the second input receiving unit 152 correlates the commodity code received in ACT 13, the commodity information read out in ACT 14, and a separately designated number of purchased items and retains the commodity code, the commodity information, and the number of purchased items in the RAM 103 or the like (ACT 15) and shifts the processing to ACT 16.

If a commodity code is not input in ACT 13 (No in ACT 13), the second input receiving unit 152 shifts the processing to ACT 16. If a user ID is not retained or if no transaction data is retained, the second input receiving unit 152 may return the processing to ACT 11 instead of ACT 16.

Subsequently, the registering unit 153 determines whether an instruction for registration completion is received via the operation unit 109 (ACT 16). If registration completion is not instructed (No in ACT 16), the registering unit 153 returns the processing to ACT 11.

On the other hand, if the registering unit 153 receives an instruction for registration completion (Yes in ACT 16), the registering unit 153 generates registration data by store based on the various data retained in ACTS 12 and 15 and the store code 1053 stored in the storing unit 105 (ACT 17). The registering unit 153 transmits the generated registration data by store to the server device 20 to register the registration data by store in the first table T1 of the storage device 21 (ACT 18) and ends this processing.

According to the processing explained above, the registration data by store of the commodities registered by the registration devices 10 in the stores are stored and managed in the first table T1 of the storage device 21 included in the server device 20. According to the registration of the registration data by store in ACT 18, the control unit 100 clears the various data retained in the RAM 103 or the like.

The operation example of the accounting device 30 is explained with reference to FIG. 11. FIG. 11 is a flowchart illustrating an example of processing performed by the accounting device 30. This processing is executed, for example, if a start of accounting processing is instructed via the operation unit 109.

First, the input receiving unit 351 stays on standby until a user ID is input via the reading device such as the scanner unit 110 or the card reading unit 111 (No in ACT 21). If receiving an input of a user ID (Yes in ACT 21), the input receiving unit 351 shifts the processing to ACT 22.

Subsequently, the acquiring unit 352 acquires, from the first table T1 of the storage device 21, registration data by store including the input user ID (ACT 22). Subsequently, the output unit 354 causes, based on the registration data by store acquired in ACT 22, the display unit 308 to display a screen showing, for each of the stores, details of commodities set as targets of accounting processing (ACT 23).

Subsequently, the accounting processing unit 353 stays on standby until a payment amount is deposited from any one of the scanner unit 310, the card reading unit 311, and the depositing and dispensing unit 312 (No in ACT 24). If a payment amount is deposited (Yes in ACT 24), the accounting processing unit 353 executes the accounting processing based on the deposited payment amount (ACT 25).

Subsequently, the output unit 354 causes, based on the registration data by store acquired in ACT 22 and a result of the accounting processing in ACT 25, the printer unit 313 to output a receipt on which the accounting target commodities and details of the accounting processing are printed (ACT 26) and ends this processing.

As explained above, in this embodiment, the registration devices 10 in the stores generate, for each transaction, registration data by store including transaction data indicating details of purchase target commodities, a user ID of a user who purchases the commodities, and store codes for identifying stores that sell the commodities. The server device 20 stores the registration data by store generated by the respective registration devices 10 in the first table T1 of the storage device 21 and centrally manages the registration data by store. If receiving an input of a user ID of a customer who performs accounting, the accounting device 30 acquires registration data by store including the user ID from the first table T1 and executes the accounting processing. The accounting device 30 outputs, based on the registration data by store acquired from the first table T1, for each of the store codes, the details of the commodities set as the purchase targets.

Consequently, the customer can perform, at a time, accounting for commodities registered as purchase targets in a plurality of stores and can easily confirm details of the commodities set as the purchase targets in the stores. Therefore, the accounting processing system 1 in this embodiment can improve convenience relating to purchase of commodities in a facility occupied by a plurality of stores.

The embodiment explained above can also be modified and implemented as appropriate by changing a part of the components or the functions of the devices explained above. Therefore, in the following explanation, several modifications relating to the embodiment explained above are explained as other embodiments. In the following explanation, differences from the embodiment are mainly explained. Detailed explanation is omitted about similarities to the above explanation. The modifications explained below may be individually implemented or may be implemented in combination as appropriate.

Modification 1

In the form explained in the embodiment, a commodity sales data processing device set in each of the stores is used as the registration device 10. However, the registration device 10 is not limited to this form. For example, the registration device 10 may be a portable terminal such as a smartphone carried by a customer.

In this case, the scanner unit 110 of the registration device 10 can be realized by, for example, an imaging device mounted on the portable terminal. As a user ID of the customer, specific information such as a terminal identifier stored in the portable terminal or a telephone number can be used. The first input receiving unit 151 reads out the specific information stored in the portable terminal as a user ID to receive an input of the user ID. As a store code, a store code transmitted from a beacon terminal or the like set in the store may be used or a store code encoded in the same form as a commodity code may be read.

In this way, the registration device 10 in a modification 1 can perform the same processing as the processing performed by the registration device 10 in the embodiment. Consequently, since the customer can register a commodity using the portable terminal carried by the customer, the customer can quickly register the commodity without waiting for registration processing in the store. Therefore, the registration device 10 in this modification can achieve further improvement of the convenience relating to purchase of commodities in a facility occupied by a plurality of stores.

Modification 2

In the form explained in the embodiment, accounting of commodities is not performed in the stores. However, it is assumed that a part of the stores occupying the facility perform accounting of commodities on the store side. It is also assumed that accounting of a part of commodities sold in the stores is performed on the store side.

Therefore, for example, the registration device 10 may perform control not to transmit, to the server device 20, data about commodities for which accounting processing is performed on the store side. Specifically, if accounting of commodities is set to be performed on the store side, the registration device 10 may perform control not to transmit commodity registration data to the server device 20. If accounting of a part of commodities is performed on the store side, the registration device 10 may exclude commodity data of commodities for which the accounting processing is performed and transmit, to the server device 20, commodity registration data including commodity data for which the accounting processing is not completed. Consequently, it is possible to prevent accounting of a commodity for which accounting is completed on the store side from being doubly performed in the accounting device 30.

As another measure, the registration device 10 may add accounting completion information, which indicates that accounting is completed, to commodity registration data or commodity data of a commodity for which the accounting processing is completed and transmit the accounting completion information to the server device 20 to identifiably transmit a commodity for which accounting is completed and a commodity for which accounting is not completed. Specifically, if accounting of a commodity is set to be performed on the store side, the registration device 10 adds the accounting completion information to the commodity registration data and transmits the accounting completion information to the server device 20. If accounting of a part of commodities is performed on the store side, the registration device 10 adds the accounting completion information to commodity data of a commodity for which the accounting processing is competed and transmits the accounting completion information to the server device 20 as commodity registration data together with commodity data for which the accounting processing is not completed. The accounting processing in the store may be performed in the registration device 10 or may be performed in another device connected to the registration device 10.

The acquiring unit 352 of the accounting device 30 extracts commodity registration data not added with the accounting completion information among commodity registration data relating to an input customer code or extracts commodity registration data excluding commodity data added with the accounting completion information among commodity data included in the commodity registration data. Consequently, since a commodity for which accounting is completed on the store side can be excluded from accounting processing targets, it is possible to prevent accounting from being doubly performed in the accounting device 30.

Modification 3

In the form explained in the embodiment, the registration data by store generated in the stores are collectively managed in the storage device 21 (the first table T1). However, a management method for the registration data by store is not limited to this. The registration data by store may be managed in a distributed manner by causing the storing units 105 included in the respective registration devices 10 to retain the first tables T1.

In this case, the registering units 153 of the registration devices 10 store generated registration data by store of the store in the first tables T1. The acquiring unit 352 of the accounting device 30 refers to the first tables T1 retained by the respective registration devices 10 and acquires, from the respective first tales T1, registration data by store including a user ID of a customer who performs accounting. Consequently, as in the first embodiment, accounting processing for a plurality of stores can be collectively performed. Therefore, the same effects as the effects in the embodiment can be achieved.

Modification 4

In the form explained in the embodiment, accounting processing for commodities selected in the stores in the facility by a single customer is collectively performed. However, among customers visiting the facility, there is also a group customer including a plurality of customers such as a family. In such a group customer, for example, a representative customer sometimes performs accounting for the other customers (hereinafter referred to as companions). Therefore, in a modification 4, a person who performs accounting is capable of collectively performing accounting processing for commodities selected in the stores in the facility by the group customer.

Figures 12, 13:
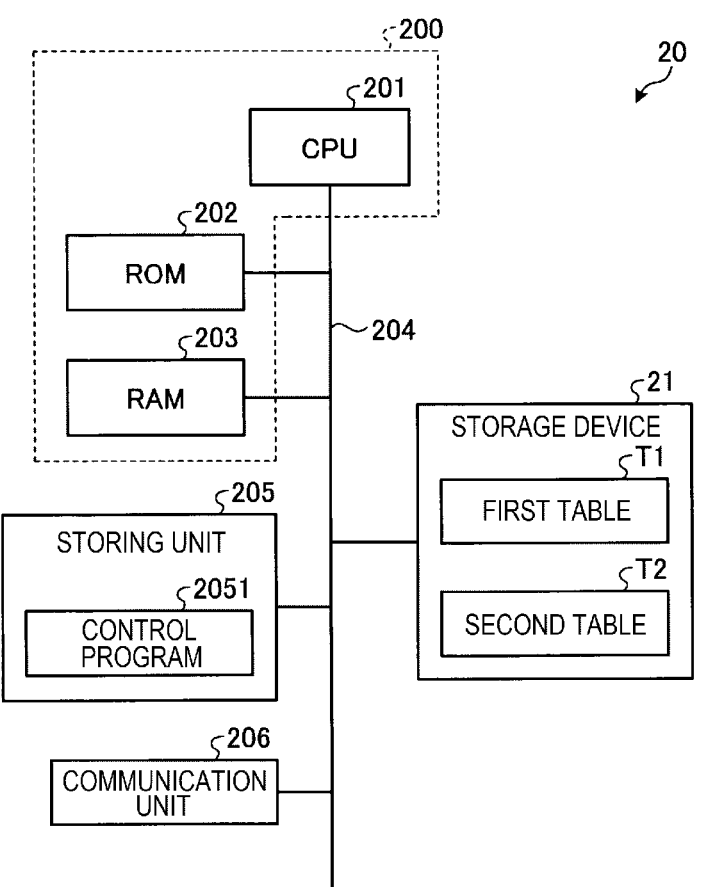
FIG. 12 is a diagram illustrating an example of a hardware configuration of a server device according to a modification 4.
FIG. 13 is a diagram illustrating an example of a data configuration of a second table according to the modification 4.

FIG. 12 is a diagram illustrating an example of a hardware configuration of the server device 20 according to this modification. As illustrated in FIG. 12, the server device 20 according to this modification stores a second table T2 in the storage device 21 in addition to the components explained with reference to FIG. 4. The second table T2 is a table for storing and managing user IDs of grouped customers. For example, the second table T2 has a data configuration illustrated in FIG. 13.

FIG. 13 is a diagram illustrating an example of the data configuration of the second table T2. As illustrated in FIG. 13, the second table T2 correlates and stores user IDs of members grouped into the same group. Group IDs are indexes for identifying groups. FIG. 13 indicates that, for example, customers with user IDs "U0001", "U0002", and "U0003" are grouped into the same group. FIG. 13 also indicates that, for example, customers with user IDs "U0021" and "U0022" are grouped into the same group.

The grouping of the user IDs may be performed in advance or may be performed at any timing. In the latter case, if receiving an input of a plurality of user IDs, which are grouping targets, from the registration device 10 or the accounting device 30 or portable terminals or the like carried by customers, the data managing unit 251 correlates the user IDs and stores the user IDs in the second table T2.

In the accounting device 30 in this modification, if a user ID of a customer who performs accounting is input, the acquiring unit 352 acquires, from the first table T1, registration data by store including the input user ID and registration data by store including other user IDs grouped into the same group as the user ID.

For example, if acquiring registration data by store in cooperation with the server device 20 is performed, as in the embodiment explained above, the acquiring unit 352 transmits the user ID of the customer who performs accounting to the server device 20 as a search key. On the other hand, the data providing unit 252 of the server device 20 specifies, from the second table T2, other user IDs correlated with the user ID of the search key. The data providing unit 252 reads out, from the first table T1, registration data by store including the user ID of the search key and the other user IDs specified from the second table T2 and transmits the registration data by store to the accounting device 30. Consequently, the acquiring unit 352 can acquire, out of the registration data by store stored in the storage device 21, together with the customer who performs accounting, registration data by store relating to other customers grouped into the same group as the customer.

For example, if the accounting device 30 can directly access the storage device 21, the acquiring unit 352 refers to the second table T2 to specify other user IDs correlated with the user ID received by the input receiving unit 351. The acquiring unit 352 reads out, from the first table T1, registration data by store respectively including the user ID received by the input receiving unit 351 and the other user IDs specified from the second table T2. Consequently, the acquiring unit 352 can acquire, out of the registration data by store stored in the storage device 21, together with the customer who performs accounting, registration data by store relating to other customers grouped into the same group as the customer.

The accounting processing unit 353 of the accounting device 30 executes accounting processing based on the registration data by store acquired by the acquiring unit 352. Consequently, even if the respective customers forming the same group individually perform registration of commodities in any stores, accounting of the registered commodities can be collectively performed. Therefore, in the accounting processing system 1 in this modification, it is possible to improve convenience relating to purchase of commodities in the facility.

In this modification, the output unit 354 may cause the display unit 308 and the printer unit 313 to output, for each of the stores, details of a commodity set as an accounting processing target and correlate the user ID included in the registration data by store with a commodity corresponding thereto and cause the display unit 308 and the printer unit 313 to output the user ID. For example, the output unit 354 may correlate a commodity name and the user ID and cause the display unit 308 and the printer unit 313 to output the commodity name and the user ID.

Consequently, the customer who performs accounting can easily confirm commodities set as purchase targets by the other members (companions) of the same group by viewing an output result of the output unit 354. Therefore, it is possible to improve convenience.

Modification 5

In the embodiment, the server device 20 and the accounting device 30 are separated. However, the server device 20 and the accounting device 30 may be integrated. In this case, for example, the accounting device 30 stores the first table T1 and the like in the storing unit 305. The control unit 300 stores commodity registration data transmitted from the registration device 10 in the first table T1.

Consequently, the accounting device 30 can execute accounting processing using the first table T1 managed by the device. Therefore, it is possible to achieve the same effects as the effects in the embodiment.

The programs executed in the devices in the embodiment are provided while being incorporated in a ROM or the like in advance. The programs executed in the devices in the embodiment may be provided while being recorded in a computer-readable recording medium such as a CD-ROM, a flexible disk (FD), a CD-R, or a DVD (Digital Versatile Disk) as a file of an installable form or an executable form.

Further, the programs executed in the devices in the embodiment may be provided while being stored on a computer connected to a network such as the Internet and downloaded through the network. The programs executed in the devices in the embodiment may be provided or distributed through a network such as the Internet.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A checkout system, comprising:

a plurality of registration devices, each registration device of the plurality of registration devices is located in a corresponding physical store of a plurality of physical stores, each registration device executes, for each transaction in the corresponding physical store, at least a registration process comprising:

identifying a customer that visits the plurality of physical stores based on receiving an input that comprises a customer identifier; and generating transaction data that comprises purchase commodity information, the customer identifier, and a store identifier of the corresponding physical store;

an accounting component comprising a display, a processor, at least one storage that stores a control program that controls operation of the accounting component, the storage maintains stored content when power from a power supply is removed, the control program, when executed by the processor, causes the accounting component to execute accounting processing for the purchase commodity information based on registration data by the plurality of physical stores, the processor, and stores the registration data in a table of the storage; and a checkout device configured to:

obtain, via a network, a plurality of the transaction data generated for each of the plurality of physical stores, the plurality of the transaction data was not settled at the plurality of physical stores, based on the registration data in the table of the storage, execute, during a single account processing transaction, a collective checkout process for all purchased commodities, and print a receipt that includes details of the plurality of the transaction data identified by store for each of the plurality of physical stores, wherein the display outputs a result that comprises the details of the plurality of the transaction data identified by store for each of the plurality of physical stores.

2. The checkout system according to claim 1, wherein the plurality of registration devices are coupled to a storage device that adds accounting completion information indicating accounting completion to the transaction data by each of the plurality of physical stores for which accounting processing is performed on a store side and store the accounting completion information, and the transaction data by each of the plurality of physical stores is acquired by excluding registration data by store added with the accounting completion information from the transaction data by store including the customer identifier.

3. The checkout system according to claim 2, wherein the storage device adds accounting completion information indicating accounting completion to the transaction data of a commodity for which accounting processing is performed on the store side and stores the accounting completion information, and the registration data by store is acquired by excluding the transaction data added with the accounting completion information from the registration data by store including the customer identifier.

4. The checkout system according to claim 2, wherein the storage device correlates and stores a plurality of customer identifiers grouped into a same group, and the registration data by store including the customer identifier is acquired and the registration data by store including other customer identifiers correlated with the customer identifier is acquired.

5. The checkout system according to claim 1, wherein a plurality of unsettled transaction data registered by the plurality of product registration devices of different stores are collectively processed by the checkout system.

6. The checkout system according to claim 1, wherein the checkout system collectively settles accounts of commodities registered as commodities to be purchased at a plurality of stores.

7. An accounting device, comprising:

a receiver configured to receive an input of a customer identifier for identifying a customer who performs accounting while visiting a plurality of stores;

an acquiring component configured to acquire, from a storage device that stores registration data by store generated for each transaction in each store, which occupy a facility that includes the plurality of stores, and including transaction data indicating details of purchase target commodities, the customer identifier of the customer who purchases the purchase target commodities at two or more stores, and store identifiers for identifying the two or more stores that sell the purchase target commodities, the registration data by store including the customer identifier received by the receiver;

a storage that stores a control program that controls a collective accounting processing, stores the registration data in a table of the storage, and maintains stored content when power from a power supply is removed;

an accounting component configured to, upon execution of the control program and based on the registration data in the table of the storage device, execute, during a single transaction, a collective accounting processing for the purchase target commodities at the two or more stores based on the registration data by store acquired by the acquiring component;

an output component configured to output, via a receipt, the details of the purchase target commodities classified for each store identifier based on the registration data by store acquired by the acquiring component and to facilitate a delivery of the commodities to the customer; and a display that outputs a result that comprises the details of the purchase target commodities classified for each store identifier, wherein the accounting device is a portable device associated with the customer who purchases the purchase target commodities.

8. The accounting device according to claim 7, wherein, in the output component, a total amount of the purchase target commodities calculated for each of the registration data by store including the same store identifier is output.

9. The accounting device according to claim 7, wherein the storage device adds accounting completion information indicating accounting completion to the registration data by store of a transaction for which accounting processing is performed on the store side and stores the accounting completion information, and in the acquiring component, the registration data by store is acquired by excluding the registration data by store added with the accounting completion information from the registration data by store including the customer identifier received in the receiving.

10. The accounting device according to claim 7, wherein the storage device adds accounting completion information indicating accounting completion to the transaction data of a commodity for which accounting processing is performed on the store side and stores the accounting completion information, and in the acquiring component, the registration data by store is acquired by excluding the transaction data added with the accounting completion information from the registration data by store including the customer identifier received in the receiving.

11. The accounting device according to claim 7, wherein the storage device correlates and stores a plurality of customer identifiers grouped into a same group, and in the acquiring component, the registration data by store including the customer identifier received in the receiving is acquired and the registration data by store including other customer identifiers correlated with the customer identifier is acquired.

\* \* \* \* \*